(12) United States Patent
Mazuk et al.

(10) Patent No.: US 9,137,038 B1
(45) Date of Patent: Sep. 15, 2015

(54) INTEGRATED MODULAR AVIONICS SYSTEM WITH DISTRIBUTED PROCESSING

(75) Inventors: Daniel E. Mazuk, Marion, IA (US);
David A. Miller, Swisher, IA (US);
Clifford R. Klein, Marion, IA (US);
Savio N. Chau, Cedar Rapids, IA (US);
Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 92 days.

(21) Appl. No.: 13/599,353

(22) Filed: Aug. 30, 2012

(51) Int. Cl.
*H04L 12/40* (2006.01)
*H04L 29/08* (2006.01)
*G06F 11/14* (2006.01)
*G05D 1/00* (2006.01)
*H04L 29/14* (2006.01)

(52) U.S. Cl.
CPC ........ *H04L 12/40195* (2013.01); *G05D 1/0077* (2013.01); *G06F 11/14* (2013.01); *H04L 67/12* (2013.01); *H04L 69/40* (2013.01); *G09G 2380/12* (2013.01); *H04L 2012/4028* (2013.01)

(58) Field of Classification Search
CPC ... H04L 67/12; H04L 69/40; H04L 12/40195; H04L 2012/4028; G09G 2380/12; G06F 11/14; G05D 1/0077
USPC ........................................................ 710/301
See application file for complete search history.

(56) References Cited

U.S. PATENT DOCUMENTS

| | | | |
|---|---|---|---|
| 5,402,319 A * | 3/1995 | Shumaker et al. ............ | 361/796 |
| 5,778,203 A * | 7/1998 | Birkedahl et al. ............ | 710/306 |
| 6,925,088 B1 * | 8/2005 | Moreaux ........................ | 370/407 |
| 7,206,877 B1 * | 4/2007 | Doerenberg et al. ......... | 710/100 |
| 7,356,336 B2 * | 4/2008 | Perez et al. .................... | 455/431 |
| 7,421,526 B2 * | 9/2008 | Fletcher et al. ............... | 710/104 |
| 7,509,537 B1 * | 3/2009 | Jensen et al. ................. | 714/47.2 |
| 7,852,235 B1 * | 12/2010 | Johnson et al. ............... | 340/945 |
| 8,015,390 B1 * | 9/2011 | Corcoran et al. .............. | 712/12 |
| 8,151,024 B2 * | 4/2012 | Nigoghosian et al. ........ | 710/104 |
| 8,275,494 B1 * | 9/2012 | Roth ................................ | 701/3 |
| 8,301,867 B1 * | 10/2012 | Mazuk et al. ................... | 712/36 |
| 8,391,788 B1 * | 3/2013 | Mazuk et al. ................. | 455/41.2 |
| 8,543,263 B2 * | 9/2013 | Danielsson et al. ............ | 701/3 |
| 8,683,105 B1 * | 3/2014 | Shultz et al. .................. | 710/300 |
| 8,694,747 B2 * | 4/2014 | Jegu et al. ..................... | 711/163 |

(Continued)

OTHER PUBLICATIONS

"MIL-STD-1553"; AIM GmbH; Version 2.3; Nov. 2010; all pages.*

(Continued)

*Primary Examiner* — Ryan Stiglic
(74) *Attorney, Agent, or Firm* — Angel N. Gerdzhikov; Donna P. Suchy; Daniel M. Barbieri

(57) ABSTRACT

The node communication controller (NCC) suitable for use in a line-replaceable unit (LRU) of a modular avionics system may include one or more embedded processors configured to host one or more functions associated with at least one avionics module of an avionics system, an input/output (I/O) controller, and one or more I/O ports, wherein the I/O controller is configured to route data between the one or more embedded processors and the at least one avionics module via the one or more I/O ports and a network communication bus, wherein the I/O controller is further configured to route data between a host processor of the LRU and an additional avionics module via the one or more I/O ports and the network communication bus.

21 Claims, 5 Drawing Sheets

(56) References Cited

U.S. PATENT DOCUMENTS

| | | | |
|---|---|---|---|
| 2005/0148327 A1* | 7/2005 | Perez et al. | 455/431 |
| 2007/0239912 A1* | 10/2007 | Fletcher et al. | 710/104 |
| 2008/0174472 A1* | 7/2008 | Stone et al. | 342/30 |
| 2010/0306435 A1* | 12/2010 | Nigoghosian et al. | 710/301 |
| 2013/0171852 A1* | 7/2013 | Todd et al. | 439/246 |
| 2013/0305391 A1* | 11/2013 | Haukom et al. | 726/29 |

OTHER PUBLICATIONS

"The ARM Cortex-A9 Processors"; ARM; Version 2.0; Sep. 2009; all pages.*

* cited by examiner

INTEGRATED MODULAR AVIONICS SYSTEM WITH DISTRIBUTED PROCESSING

TECHNICAL FIELD

The present invention generally relates to avionics systems, and more particularly to an integrated modular avionics system having distributed processing capabilities.

BACKGROUND

Due to the ever growing performance and cost demands on the manufacture and maintenance of avionics systems, it is desirable to produce an improved avionics system architecture. Modern avionics networks act to provide data transfer capabilities between various portions of an aircraft. Avionics systems typically include numerous sub-systems that provide data transfer to and from the processing components of an aircraft. For instance, avionics modules may collect avionics data (e.g., sensors detecting speed, direction, external temperature, control surface positions, and the like), which is then routed to one or more aircraft components (e.g., displays, monitoring circuits, processors, and the like) via an avionics communication network.

Ethernet based networks have been implemented in avionics communication networks in order to provide communication between the various aircraft components. Typically, an Ethernet network may be used route data in a digital form via packets or frames. In a typical avionics network environment, the given Ethernet network includes different components that subscribe to the avionics network and connect to each other through various switches. Each network subscriber can transmit packets to one or more other subscribers. When a switch receives a packet, the switch determines the destination equipment and directs or switches the packets to such equipment.

Ethernet networks utilized in avionic system may include Avionics Full Duplex (AFDX) switch Ethernet networks. In a switched full-duplex Ethernet network, the term "switched" refers to the packets being switched in switches on appropriate outputs. These networks require multiple switches and redundant paths to route data, point-to-point or point-to-multipoint across the various switches. Typically, integrated modular avionics (IMA) architectures are implemented in aircraft development to reduce the size, weight, and price footprint of the avionics system of the aircraft.

Currently implemented IMA architectures tend to be complex and are difficult to certify given the numerous aircraft functions hosted on them. In addition, the current IMA architectures do not scale adequately for large numbers of applications due to the degree of change necessary to integrate multiple aircraft functions on a common processing environment. As such, it is desirable to produce an avionics network that cures the defects of previous networks and provides reduced hardware cost and improved functionality.

SUMMARY

An integrated modular avionics (IMA) system having distributed processing capabilities is disclosed. In one aspect, the integrated modular avionics system may include, but is not limited to, one or more network communication busses; at least one avionics modules; a plurality of line-replaceable units (LRUs) operably coupled to the one or more communication busses, each LRU comprising: a host processor configured to host one or more native functions of the LRU; and a node communication controller (NCC) suitable for hosting one or more functions of the one or more avionics modules.

In a further aspect, the NCC may include, but is not limited to, one or more embedded processors configured to host one or more functions associated with the one or more avionics modules; an input/output (I/O) controller; one or more I/O ports, wherein the I/O controller is configured to route data between the one or more embedded processors of the NCC and the one or more avionics modules via the one or more I/O ports and the one or more communication busses, wherein the I/O controller is further configured to route data between the host processor of the LRU and an additional avionics module via the one or more I/O ports and the one or more communication busses.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 1A through 3, an integrated modular avionics system 100 having distributed process capabilities is described in accordance with the present invention. The present invention is directed to a distributed processing architecture suitable for providing distributed processing capabilities in an integrated modular avionics system. In order to accomplish these distributed processing capabilities, each line replaceable unit of the avionics system is equipped with a network communication controller including one or more embedded processors.

In many settings, processing requirements in avionics systems are accomplished utilizing one or more centralized processing units, whereby various components of the avionics system are coupled to a processing unit via a communications network. Communication networks used in the context of modular avionics systems may include, for example, open networking Ethernet and AFDX switch Ethernet networks. In addition, modern avionics system may include optical networking capabilities, whereby various components of the avionics system are communicatively coupled via an optical bus (e.g., optical fiber bus). Optical networking systems may include a passive optical network (PON) or an Ethernet passive optical network (EPON). EPON based avionics systems are described in detail by Mazuk et al. in U.S. Pat. No. 8,078,055, issued on Dec. 13, 2011, which is incorporated herein in the entirety.

The present invention is directed to a modular avionics system that reduces or eliminates the need for centralized process capabilities through the implementation of distributed processing via a network communication controller, whereby a function of a given component of the avionics system is hosted on one or more embedded processors located within one or more of the node communication controllers of the avionics system.

Figure 1A:
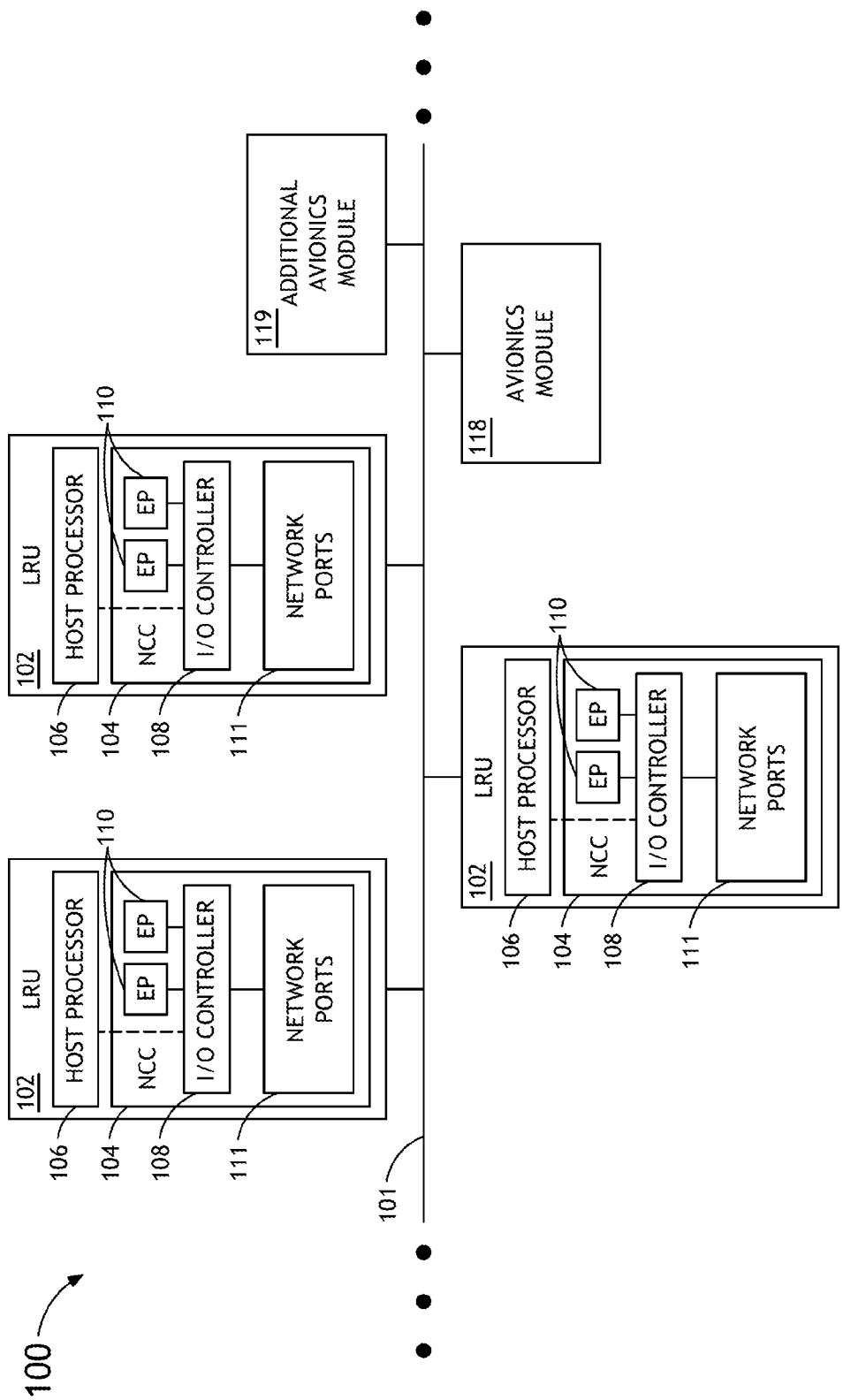
FIG. 1A is a block diagram of an integrated modular avionics system, in accordance with one embodiment of the present invention.
Figure 1B:
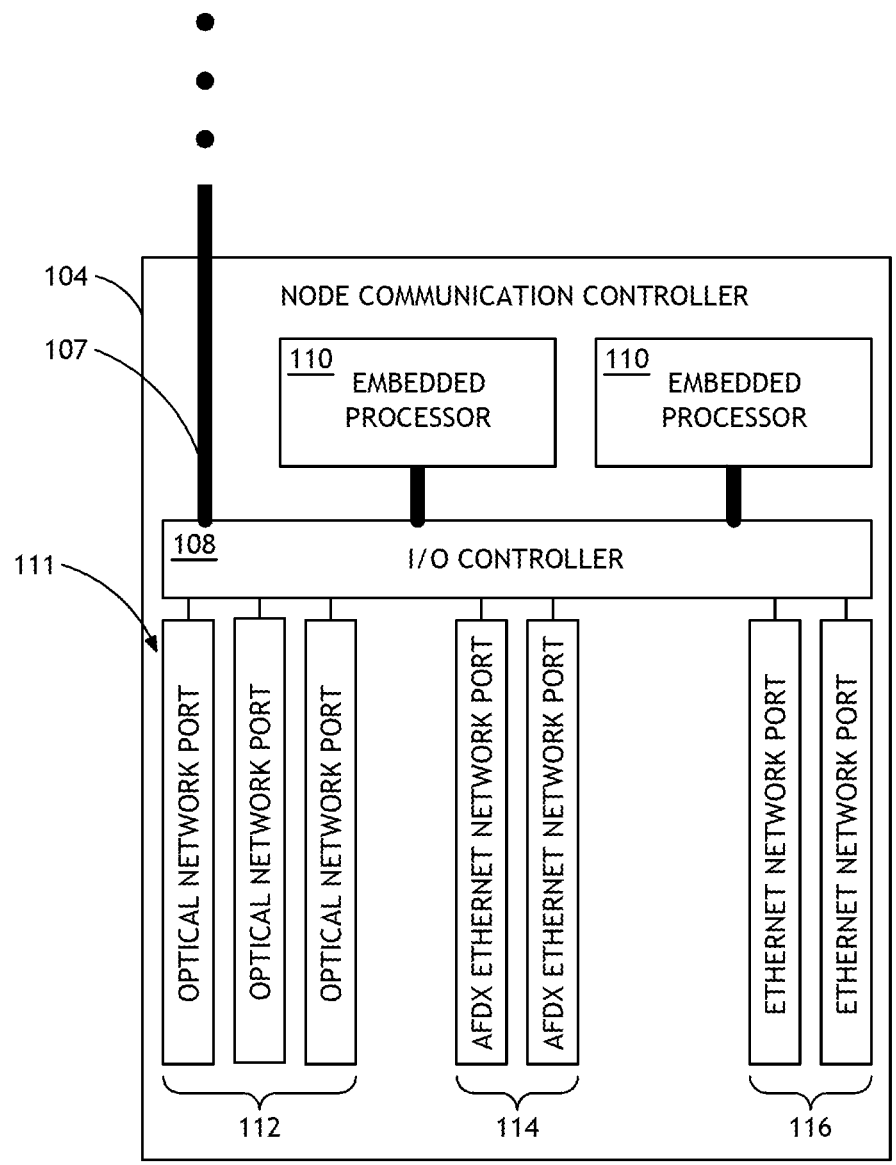
FIG. 1B is a block diagram of a network communications controller, in accordance with one embodiment of the present invention.

FIGS. 1A and 1B illustrate a block diagram view of an integrated modular avionics system 100, in accordance with an exemplary embodiment of the present invention. In one aspect, the integrated modular avionics system 100 includes two or more line replaceable units (LRUs) 102 operably connected to one or more communication network busses 101 (e.g., optical network bus, AFDX network bus, Ethernet network bus, and the like). Each LRU 102 of the system 100 may include a node communication controller (NCC) 104 and a host processor 106 configured to host one or more native functions of the given LRU 102.

In a further aspect of the present invention, the network communication controller 104 of each LRU 102 may include one or more embedded processors 110 (e.g., A9 ARM processor) configured to carry out, or "host," one or more avionics modules 118 of the modular avionics system 100. In this regard, the embedded processors 110 of each NCC 104 may host avionics functions that are unrelated to the function of the given LRU 102. In an additional embodiment, the system 100 may support a single hosted function on two or more independent NCCs 104 of two or more LRUs 102. In this regard, the redundantly supported hosted function is less susceptible to power failure or other types of LRU malfunction.

Additionally, the host processor 106 of each LRU 102 is configured to "host" one or more native functions of the given LRU 102. In this regard, the host processor 102 of each LRU 102 may carry out functions associated with the specific LRU 102 the host processor 102 is disposed in (e.g., host processor of Radio LRU may carry out functions of associated with the Radio LRU). For instance, the host processor 102 may execute program instructions needed for carrying out functions associated with the given LRU 102, while also acting to control the hardware of the given LRU 102.

In a further aspect of the present invention, each NCC 104 of each LRU 102 may include an input/output (I/O) controller 108. The I/O controller 108 of each NCC 104 enables the NCC 104 of each LRU 102 to serve as both a generic processing platform and a common I/O node platform. The I/O controller 108 is communicatively to the host processor 106 of each NCC 104 via a high speed data link 107. The high speed data link 107 may include any high speed data link known in the art including, but not limited to, a PCI express data link, a 10 Gbps Ethernet data link, or a 1 Gbps Ethernet data link.

In one aspect of the present invention, the I/O controller 108 of each NCC 104 is configured to support communication between the host processor 106 of the LRU 102 and other portions of the avionics system 100. In this regard, the I/O controller 108 may route data between the host processor 106 of the given LRU 102 and an additional avionics module 119, wherein the additional avionics module 119 is related to the functions of the given LRU 102. Further, the I/O controller 108 may route data between the host processor 106 of a given LRU 102 and an additional avionics module 119 using one or more I/O ports 111 (e.g., an optical network port 112, an AFDX network port 114, or an Ethernet port 116) of the NCC 104 and one or more network communication busses 101.

In an additional embodiment, the I/O controller 108 of each NCC 104 of each LRU 102 may include any I/O controller known in the art. In one embodiment, the I/O controller 108 may include an optical AFDX Off-Load engine. In this regard, the AFDX Off-load engine of a given NCC 104 may be configured to manage transmission/reception of data between the one or more embedded processors 110 and the network bus 101 via the network ports 111.

In another aspect of the present invention, the I/O controller 108 of each NCC 104 is configured to route data between the one or more embedded processors 110 of the NCC 104 to the one or more avionics module 118, wherein the functions of the one or more avionics module 118 are unrelated to the given LRU 102. Further, the I/O controller 108 may route data between the embedded processors 110 of an NCC 104 of a given LRU 102 and the one or more avionics module 118 using one or more I/O ports 111 of the NCC 104 and one or more network communication busses 101. In this regard, the one or more embedded processors 110 of the NCC 104 transmit and/or receive data on the network 101 via the I/O controller 108.

While much of the present disclosure focuses on embodiments of the present invention including an LRU 102 equipped with a host processor 106, it is recognized herein that in some instances the processing requirements of a given LRU 102 may not require a separate host processor, or system processor, for the LRU. In this sense, the logic functions of the given LRU may be satisfied using the one or more embedded processors 110 of the NCC 104 of the given LRU 102. As such, in some embodiments, the system 100 may include at least one LRU 102 which lacks a host processor, or system processor. The LRU of the system may, however, include an NCC 104 equipped with one or more embedded processors 110 suitable for handling the processing requirements of the LRU.

The integrated avionics system 100 of the present invention may be configured to operate using any communications network protocol known in the art. As such, the network bus 101 of the integrated modular avionics system 100 may include any communication network bus known in the art. In one embodiment, the network bus 101 may include an optical Ethernet bus associated with an optical Ethernet network. In this regard, each LRU 102 of the system 100 may be equipped with at least one or more optical Ethernet network port 112s allowing each LRU 102 to communicate with various portions of the avionics system 100. In a further embodiment, the network bus 101 may include a passive optical network (PON) bus. For instance, the system 100 may be configured as an Ethernet PON (EPON) system, a gigabit Ethernet PON (GEPON) system, a gigabit passive optical network (GPON), or the like. For example, in a passive optical network (PON) configuration, each LRU 102 may be communicatively connected to the network via a fiber optic bus.

In another embodiment, the network bus 100 may include an avionics full-duplex switched Ethernet (AFDX) bus of an AFDX network. In this regard, each LRU 102 of the system 100 may be equipped with at least one or more AFDX network ports 114 allowing each LRU 102 to communicate with various portions of the avionics system 100. In another embodiment, the network bus 100 may include an open networking Ethernet bus of an open networking Ethernet network. In this regard, each LRU 102 of the system 100 may be equipped with at least one or more open networking Ethernet network ports 116 allowing each LRU 102 to communicate with various portions of the avionics system 100.

While the present invention is generally discussed in the context of Ethernet-based communication networking, it is recognized herein that the network bus 101 of the present invention may include various other networking protocols. For example, the network bus 101 of the system 100 may include, but is not limited to, an IEEE 1553 based bus, an IEEE 1394a based bus, an IEEE 1394b based bus, a FlexRay based bus, a TPP based bus, a PCI Express based bus and the like.

Each of the LRUs 102 of the modular avionics system 100 may include any LRU known in the art. For example, one or more of the LRUs 102 of the system 100 may include a radio LRU, a display LRU (e.g., primary flight display (PFD), a multi-function display (MFD), and the like), a cabinet audio component, aircraft brakes, a secondary power system, a flight management, a flight control system, a surveillance system and the like. Each LRU 102 is selectively removable from the system 100, allowing for the efficient replacement of each LRU. Further, the LRUs 102 of the system 100 may be designed to commonly implemented specifications in order to allow for interchangeability within a given aircraft as well as providing cross-compatibility between multiple aircraft. It is noted herein that the present invention is not limited to a particular type of LRU 102 as it is contemplated that the present invention may be extended to include any LRU 102 known in the art.

The one or more embedded processors 110 of each NCC 104 of each LRU 102 may include any processing unit known in the art. For example, the one or more embedded processors 110 may include a multicore processor. For instance, the one or more embedded processors 110 of each NCC 104 may include an A9 ARM processor. It is further noted that the embedded drivers 110 may be configured in asymmetric multi-processing mode (AMP). Those skilled in the art should recognize that the listed processor type is provided merely for illustrative purposes and should not be interpreted as limiting.

It is recognized herein that two different types of computation microprocessors may be utilized to support communication on the NCC 104 of one or more LRUs 102 of the system 100, thereby enhancing the computational integrity of the system 100. In one embodiment, the NCC 104 may include a first embedded processor and at least a second embedded processor. In this regard, the first embedded processor may be a different type than the at least a second embedded processor.

The avionics modules 118 or 119 may include any avionics module known in the art. It is noted herein that while the avionics modules of the present invention are depicted as discrete components of the system 100, those skilled in the art should recognize that the functionality of a given avionics module may be implemented in a variety of ways. For example, the avionics modules 118 and 119 may include, but are not limited to, software, hardware, firmware, application specific integrated circuitry (ASICs) and the like. In a general sense, the avionics module 118 may include any function of the avionics system 100 unrelated to the LRU that includes the NCC 104 that hosts the given avionics function. For example, in a radio LRU, the avionics module 118 hosted by the one or more embedded processors 110 may include a computation application, such as a window heat application, or a display application, such as a checklist generation function. It is noted herein that the computation application or display application are wholly unrelated to the functioning of the radio LRU. Additional avionics modules 118 suitable for hosting by one or more embedded processors 110 of the NCCs 104 of the system 100 include, but are not limited to, flight control sensors (e.g., flight control surface sensors), landing gear sensors, cabin climate sensors, cockpit display devices, and the like.

Figure 1C:
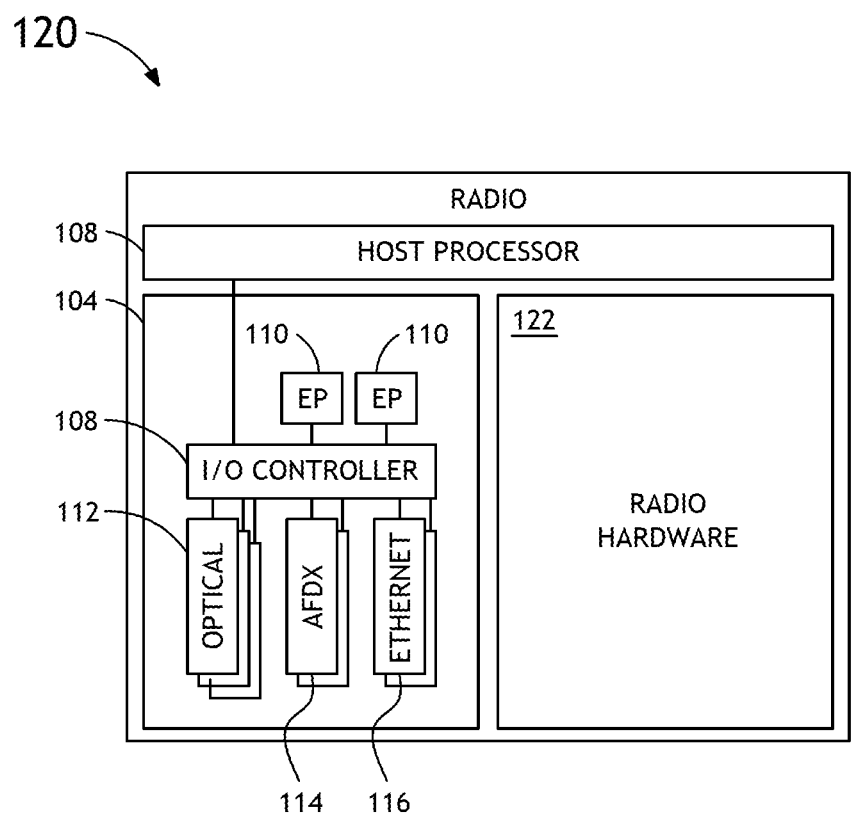
FIG. 1C is a block diagram of a Radio LRU equipped with a network communications controller, in accordance with one embodiment of the present invention.

FIG. 1C illustrates a block diagram view of a radio LRU 120 equipped with the node communication controller 104 of the present invention, in accordance with one embodiment of the present invention. For example, in the case of a radio LRU, the host processor 106 may execute program instructions needed for radio startup, data loading, configuration, mode control, DSP mode setting and configuration, and the like. In addition, the host processor 106 is configured to control the radio hardware 122 (e.g., DSPs, Codec, and the like) of the radio LRU needed to receive and generate signal waveforms. The host processor 108 of the radio LRU 120 may then communicate with the additional avionics module 119 (i.e., function relating to the function of the radio LRU) via an I/O controller 108 of the NCC 104. Further, as has been described throughout the present disclosure, the radio LRU 120 includes an NCC 104 equipped with one or more embedded processors 110 configured to host one or more functions of the system 100 not related to the specific LRU of the given LRU. For example, the embedded processors 110 of a radio LRU may host a computation application (e.g., window heat computation) or a display application (e.g., checklist generation). It is noted herein that the LRUs 102 of the present invention are not limited to the specific example of the radio LRU depicted in FIG. 102. It is further noted that the present invention may be extended to include various LRUs 102, such as, but not limited to, display LRUs, audio LRUs, and the like, as described previously herein. In addition, it is further noted that a given function of the aircraft may be carried out via multiple LRUs and is not limited to a single LRU.

Figure 2:
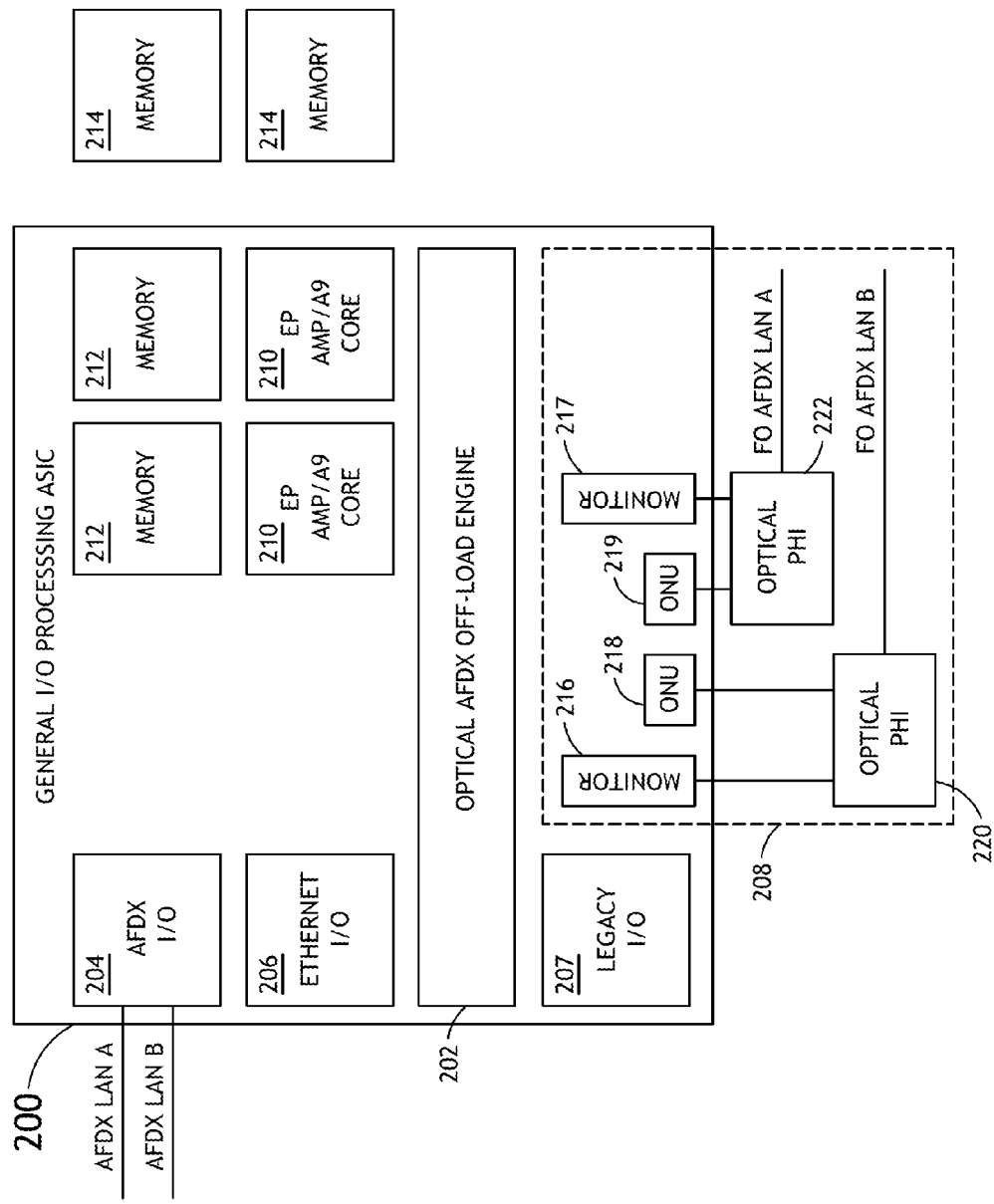
FIG. 2 is a block diagram of a General I/O Processing ASIC, in accordance with one embodiment of the present invention.

FIG. 2 illustrates a block diagram view of a network communication controller of the present invention configured as a General I/O Processing ASIC 200 suitable for implementation in an optical network (e.g., optical network based on EPON). In a general sense, the General I/O Processing ASIC 200 includes both networking and processing capabilities for many aircraft functions. The processing ASIC 200 may include one or more embedded processors 210 (e.g., A9 AMP processors), one or more internal memory units 212, and one or more external memory units 214. In addition, the ASIC 200 may include multiple I/O networking interface units. In one aspect, the ASIC 200 may include one or more AFDX I/O network port 204 suitable for interfacing with one or more AFDX networks (e.g., AFDX LAN A, AFDX LAN B). In another aspect, the ASIC 200 may include an open networking Ethernet port for interfacing with an open Ethernet network and one or more legacy I/O ports 207. In a further aspect, the General I/O Processing ASIC 200 may include an optical network interface unit 208.

The optical network interface unit 208 may include the various hardware components required to interface with a passive optical network, such as an EPON, GEPON, GPON and the like. For example, the optical network interface architecture 208 of the ASIC 200 may include one or more optical network units (ONUs) 218, 219 suitable for interfacing with the optical phi 220, 221 of the optical network (e.g., fiber optic based AFDX LAN A, fiber optic based AFDX LAN B) and communicating with an avionics module (not shown) coupled to the optical network. The optical network interface architecture 208 may further include one or more monitors 216, 217 suitable for monitoring data transfer on the given optical network.

Further, the General I/O Processing ASIC 200 includes an Optical AFDX Off-Load Engine 202. The Off-Load Engine 202 is configured to manage communication between the embedded processors 210 and the various avionics functions executed by the embedded processors 210 via a given network and the interface infrastructure used to couple to the given network. In a further embodiment, the General I/O Processing ASIC 200 is connectable to a high performance processor (not shown) for aircraft functions requiring more powerful processing capabilities. In this manner, the Off-Load Engine 202 may be communicatively coupled to a host processor, or a system processor, of a given LRU via a high speed data link (not shown) (e.g., PCI express), as shown previously herein. The Off-Load Engine 202 may then manage communication between the host processor and other portions of the avionics system via one or more of the networks.

Figure 3:
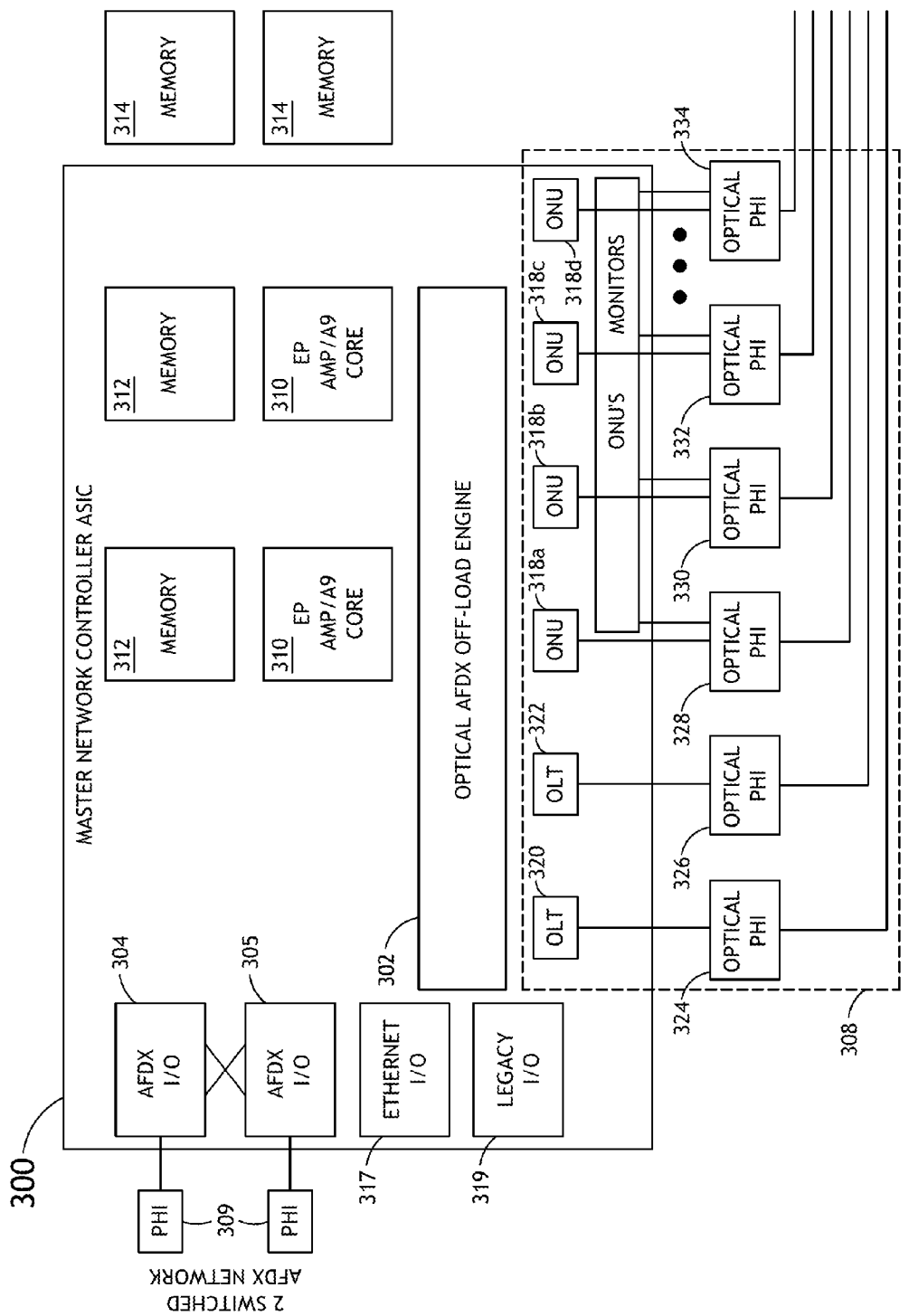
FIG. 3 is a block diagram of a Master Network Controller ASIC, in accordance with one embodiment of the present invention.

FIG. 3 illustrates a block diagram view of a network communication controller of the present invention configured as a Master Network Controller ASIC 300. The Master Network Controller ASIC 300 of the present invention may be suitable for controlling a switchless optical network (e.g., EPON) and may be particularly useful for high integrity aircraft functions.

As described previously herein, controller ASIC 300 may include one or more embedded processors 310 (e.g., A9 AMP processors), one or more internal memory units 312, and one or more external memory units 314. In addition, the ASIC 200 may include multiple I/O networking interface units. In one aspect, the ASIC 300 may include one or more AFDX I/O network ports 304, 305 suitable for interfacing with the phi 307 of one or more switch AFDX networks. In another aspect, the ASIC 300 may include an open networking Ethernet port 317 for interfacing with an open Ethernet network and one or more legacy I/O ports 319. In a further aspect, the Master Network Controller ASIC 300 may include an optical network interface unit 308.

The optical network interface unit 308 may include the various hardware components required to interface with a passive optical network, such as an EPON, GEPON, GPON and the like. For example, the optical network interface architecture 308 of the ASIC 300 may include one or more optical network units (ONUs) 318a-318d and optical line terminals (OLTs) 320-322 suitable for interfacing with the optical phi 324-334 of multiple optical networks (e.g., 8-16 switchless fiber optic based AFDX networks). The optical network interface architecture 308 may further include one or more monitors 316 suitable for monitoring data transfer on the given optical network.

Further, the Master Network Controller ASIC 300 includes an Optical AFDX Off-Load Engine 302. The Off-Load Engine 302 is configured to manage communication between the embedded processors 310 and the various avionics functions executed by the embedded processors 310 via the network and the interface infrastructure used to couple to the given network. In a further embodiment, the Master Network Controller ASIC 300 is connectable to a high performance processor (not shown) for aircraft functions requiring more powerful processing capabilities. In this manner, the Off-Load Engine 302 may be communicatively coupled to a host processor, or a system processor, of a given LRU via a high speed data link (not shown) (e.g., PCI express), as shown previously herein. The Off-Load Engine 302 may then manage communication between the host processor and other portions of the avionics system via one or more of the networks.

In an additional aspect, it is recognized herein that for high integrity hosted applications both the switched network (controlled by 200) and switchless network (controlled by 300) described above may be implemented simultaneously in order to route data to additional components of the avionics system.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An integrated modular avionics (IMA) system comprising:
   one or more network communication busses;
   at least one avionics module;
   a first line replaceable unit operably coupled to the one or more communication busses, the first line replaceable unit including a first node communication controller having one or more first embedded processors;
   an additional line replaceable unit operably coupled to the one or more communication busses, the additional line replaceable unit including an additional node communication controller having one or more additional embedded processors,
   wherein the one or more first embedded processors of the first node communication controller and the one or more additional embedded processors of the additional node communication controller redundantly host the at least one avionics module, wherein the avionics function of the at least one avionics module is unrelated to at least one of a function of the first line replaceable unit or a function of the additional line replaceable unit.

2. The integrated modular avionics system of claim 1, wherein the one or more network communication busses comprise:
   an Ethernet bus.

3. The integrated modular avionics system of claim 1, wherein the one or more network communication busses comprise:
   an Avionics Full-Duplex Switched Ethernet (AFDX) bus.

4. The integrated modular avionics system of claim 1, wherein the one or more network communication busses comprise:
   an optical network bus.

5. The integrated modular avionics system of claim 4, wherein the optical network bus comprises:
   an Ethernet passive optical network (EPON) bus.

6. The integrated modular avionics system of claim 1, wherein the one or more network communication busses comprises:
   at least one of an IEEE 1553 bus, an IEEE 1394a bus, an IEEE 1394b bus, a FlexRay bus, a TPP bus, and a PCI Express bus.

7. The integrated modular avionics system of claim 1, wherein at least one of the first line replaceable unit or the additional line replaceable unit includes a host processor and an I/O controller communicatively coupled via a high-speed interconnection.

8. The integrated modular avionics system of claim 7, wherein the high-speed interconnection comprises at least one of a PCI express data link, a 10 Gbps Ethernet data link, and a 1 Gbps Ethernet data link.

9. The integrated modular avionics system of claim 1, wherein at least one of the one or more first embedded processors of the first node communication controller or the one or more additional embedded processors of the additional node communication controller comprises:
   a first processor and at least a second processor, wherein the first processor is different than the at least a second processor.

10. The integrated modular avionics system of claim 7, wherein the I/O controller comprises:
    an optical AFDX off-load engine.

11. The integrated modular avionics system of claim 1, wherein at least one of the first line replaceable unit or the additional line replaceable unit comprise:
    at least one of a display unit, a radio, and a cabin audio device, an aircraft braking system, a secondary power system, a flight management system, a flight control system, and a surveillance system.

12. The integrated modular avionics system of claim 1, wherein the at least one avionics module is simultaneously hosted on a first node communication controller of a first line replaceable unit and at least a second node communication controller of at least a second line replaceable unit.

13. The integrated modular avionics system of claim 1, wherein at least one of the first node communication controller or the additional node communication controller are configured as a general I/O processing ASIC.

14. The integrated modular avionics system of claim 1, wherein at least one of the first node communication controller or the additional node communication controller are configured as a master network controller ASIC.

15. An integrated modular avionics (IMA) system comprising:
    a network communication bus;
    at least one avionics module;
    a first line replaceable unit operably coupled to the network communication bus, the first line replaceable unit including:
    a first node communication controller including: one or more first host processors configured to host one or more native functions of the first line replaceable unit; and one or more first embedded processors;

an additional line replaceable unit operably coupled to the network communication bus, the additional line replaceable unit including:
an additional node communication controller including:
one or more additional host processors configured to host one or more native functions of the additional line replaceable unit; and one or more additional embedded processors,
wherein the one or more first embedded processors of the first node communication controller and the one or more additional embedded processors of the additional node communication controller redundantly host the at least one avionics module, wherein the avionics function of the at least one avionics module is unrelated to at least one of a function of the first line replaceable unit or a function of the additional line replaceable unit.

16. The integrated modular avionics system of claim 15, wherein the network communication bus comprises:
at least one of an Ethernet bus, an Avionics Full-Duplex Switched Ethernet (AFDX) bus, and an optical network bus, an IEEE 1553 bus, an IEEE 1394a bus, an IEEE 1394b bus, a FlexRay bus, a TPP bus, and a PCI Express bus.

17. The integrated modular avionics system of claim 15, wherein at least one of the first line replaceable unit or the additional line replaceable unit comprises:
an input/output (I/O) controller;
one or more I/O ports coupled to the network communications bus, wherein the I/O controller is configured to route data between at least one of the first embedded processor or the additional embedded processor and the at least one avionics module via the one or more I/O ports and the network communication bus, wherein the one or more I/O ports include at least one of an optical network port, a AFDX network port, and an Ethernet port, an IEEE 1553 port, an IEEE 1394a port, an IEEE 1394b port, a FlexRay port, a TPP port, and a PCI Express port.

18. The integrated modular avionics system of claim 15, wherein at least one of the one or more first embedded processors of the first node communication controller or the one or more additional embedded processors of the additional node communication controller comprises:
an A9 ARM processor.

19. The integrated modular avionics system of claim 15, wherein at least one of the one or more first embedded processors or the one or more additional embedded processors comprises:
a first processor and at least a second processor, wherein the first processor is different than the at least a second processor.

20. The integrated modular avionics system of claim 15, further comprising:
an I/O controller.

21. The integrated modular avionics system of claim 15, further comprising:
one or more memory units.

* * * * *